United States Patent
Tang

(10) Patent No.: US 10,275,584 B2
(45) Date of Patent: Apr. 30, 2019

(54) METHOD AND SYSTEM FOR UNLOCKING MOBILE TERMINAL ON THE BASIS OF A HIGH-QUALITY EYEPRINT IMAGE

(71) Applicant: JRD COMMUNICATION INC., Shenzhen (CN)

(72) Inventor: Xiangdong Tang, Shenzhen (CN)

(73) Assignee: JRD COMMUNICATION INC., Shenzhen (CN)

( * ) Notice: Subject to any disclaimer, the term of this patent is extended or adjusted under 35 U.S.C. 154(b) by 75 days.

(21) Appl. No.: 15/107,992

(22) PCT Filed: Dec. 8, 2015

(86) PCT No.: PCT/CN2015/096657
§ 371 (c)(1),
(2) Date: Jun. 24, 2016

(87) PCT Pub. No.: WO2016/176990
PCT Pub. Date: Nov. 10, 2016

(65) Prior Publication Data
US 2017/0124309 A1    May 4, 2017

(30) Foreign Application Priority Data

May 4, 2015 (CN) .......................... 2015 1 0220211

(51) Int. Cl.
*G06F 21/32* (2013.01)
*G06K 9/00* (2006.01)
*G06F 21/31* (2013.01)
*G06F 21/36* (2013.01)
*H04L 29/06* (2006.01)

(52) U.S. Cl.
CPC .............. *G06F 21/32* (2013.01); *G06F 21/31* (2013.01); *G06F 21/36* (2013.01); *G06K 9/00597* (2013.01); *H04L 63/0861* (2013.01); *G06F 2221/2147* (2013.01)

(58) Field of Classification Search
CPC ...... G06K 9/00597; G06F 21/32; G06F 21/31
See application file for complete search history.

(56) References Cited

U.S. PATENT DOCUMENTS 5,497,191 A * 3/1996 Yoo ..................... H04N 5/23248
                                                    348/208.6
5,818,457 A * 10/1998 Murata ................... G06T 11/00
                                                    345/629

(Continued)

*Primary Examiner* — James R Turchen
(74) *Attorney, Agent, or Firm* — Shimokaji IP

(57) ABSTRACT

A method and a system for unlocking a mobile terminal on the basis of a high-quality eyeprint image may include collecting an original image of a current user by utilizing a front-facing camera when the mobile terminal needs to be unlocked; carrying out a 1080p image cropping on the original image by means of a register configured for the front-facing camera to obtain an eye image located in a special area of the original image; carrying out an eyeprint analysis and processing on the eye image to acquire eyeprint information of the current user; making a comparison between the eyeprint information and prestored eyeprint information to judge whether the comparison result shows that they are identical or not; and unlocking the mobile terminal if it is judged that they are identical.

9 Claims, 2 Drawing Sheets

(56) References Cited

U.S. PATENT DOCUMENTS

| | | | | |
|---|---|---|---|---|
| 6,181,803 B1* | 1/2001 | Davis | G06F 21/32 | 380/30 |
| 7,933,507 B2* | 4/2011 | Jelinek | G06K 9/00604 | 348/164 |
| 9,767,358 B2* | 9/2017 | Xue | H04N 5/23219 | |
| 2003/0007075 A1* | 1/2003 | Masuda | H04N 5/23209 | 348/208.11 |
| 2007/0274570 A1* | 11/2007 | Hamza | G06K 9/0061 | 382/117 |
| 2009/0089869 A1* | 4/2009 | Varghese | G06F 21/31 | 726/7 |
| 2009/0226047 A1* | 9/2009 | Yu | G06K 9/00248 | 382/118 |
| 2010/0110275 A1* | 5/2010 | Mathieu | A61B 5/1171 | 348/360 |
| 2013/0015946 A1* | 1/2013 | Lau | G07C 9/00 | 340/5.2 |
| 2013/0162798 A1* | 6/2013 | Hanna | A61B 3/14 | 348/78 |
| 2013/0162799 A1* | 6/2013 | Hanna | A61B 5/117 | 348/78 |
| 2013/0222632 A1* | 8/2013 | Okamoto | H04N 5/23219 | 348/222.1 |
| 2015/0302252 A1* | 10/2015 | Herrera | G06K 9/00617 | 382/117 |
| 2016/0005176 A1* | 1/2016 | Nguyen | G06F 3/013 | 382/103 |
| 2016/0019421 A1* | 1/2016 | Feng | G06K 9/00604 | 382/117 |
| 2016/0117544 A1* | 4/2016 | Hoyos | H04N 5/23219 | 348/78 |
| 2016/0364561 A1* | 12/2016 | Lee | H04M 1/67 | |
| 2017/0091550 A1* | 3/2017 | Feng | G06K 9/00597 | |
| 2017/0186138 A1* | 6/2017 | Raducan | G06F 17/30244 | |
| 2017/0206412 A1* | 7/2017 | Kaehler | G06F 3/013 | |
| 2017/0220861 A1* | 8/2017 | Hanna | G06K 9/00221 | |
| 2017/0278122 A1* | 9/2017 | Kaehler | G06K 9/00604 | |

* cited by examiner

METHOD AND SYSTEM FOR UNLOCKING MOBILE TERMINAL ON THE BASIS OF A HIGH-QUALITY EYEPRINT IMAGE

TECHNICAL FIELD

The present invention relates to the field of eyeprint recognition image processing technologies, and more particularly, to a method and a system for unlocking a mobile terminal on the basis of a high-quality eyeprint image.

BACKGROUND

With the popularization of smart machines, many users may utilize lock screen software to protect their privacy on their mobile terminals, beautify their mobile terminals, and reduce incorrect operation. Eyeprint recognition lock screen software may be lock screen software for protecting privacy on users' mobile terminals. Each person's eye texture may be different and less likely to change greatly. The eyeprint recognition lock screen software may utilize this principle to determine whether or not a user is an owner of the mobile terminal by means of eyeprint analysis.

The eyeprint recognition lock screen software may utilize a front-facing camera to acquire eye image information from a user, and then may process and analyze the image information. Therefore, requirements for image quality from the front-facing camera may be higher. In addition, only eye texture information may be utilized for recognition, that is, other parts may not be used except the eye image, and these redundant images may have a negative effect on the unlocking speed.

In eyeprint recognition technologies, conventionally, 1080p down scale may be carried out on an image data source, by setting up a prompt for image correction in an original image, the user may put eyes in the middle position of the image and this part may be analyzed and processed. 1080p down scale may be carried out by means of a full pixel, which may lose a part of the eye details. Furthermore, only a part of the image may be used, but it may be outputted in full pixel, which may cause problems of bandwidth waste and a low transmission speed, etc.

Therefore, the prior art needs to be improved and developed.

SUMMARY

In view of the foregoing disadvantages of the prior art, an objective of the present invention may be to provide a method and a system for unlocking a mobile terminal on the basis of a high-quality eyeprint image, and it may solve the problems, in the prior art, of oversize integral eye image transmission, a waste of bandwidth, and a low transmission speed.

There may be provided a method for unlocking a mobile terminal on the basis of a high-quality eyeprint image, including the following steps:

collecting an original image of a current user by utilizing a front-facing camera when the mobile terminal needs to be unlocked;

carrying out a 1080p image cropping on the original image by means of the register configured for the front-facing camera to obtain an eye image located in a special area of the original image;

carrying out an eyeprint analysis and processing on the eye image to acquire eyeprint information of the current user; and making a comparison between the eyeprint information and prestored eyeprint information to determine whether a comparison result shows that they are identical or not; and unlock the mobile terminal if it is determined that they are identical.

In the method for unlocking a mobile terminal on the basis of a high-quality eyeprint image, Step B may specifically include the following step:

B1: cropping the original image by means of a horizontal cropping start register, a horizontal cropping end register, a vertical cropping start register and a vertical cropping end register configured for the front-facing camera, and adjusting an offset by means of a configured horizontal offset register and a vertical offset register.

In the method for unlocking a mobile terminal on the basis of a high-quality eyeprint image, Step B1 may show that the cropped eye image is in the middle of the original image.

In the method for unlocking a mobile terminal on the basis of a high-quality eyeprint image, Step C may specifically include: synthesizing and denoising the eye image to acquire the eyeprint information of the current user.

The method for unlocking a mobile terminal on the basis of a high-quality eyeprint image may further include: activating a password or nine-grid pattern preset for the mobile terminal to unlock the mobile terminal once unlocking the mobile terminal has failed.

A system for unlocking a mobile terminal on the basis of a high-quality eyeprint image may include:

a collection module, configured to collect an original image of a current user by utilizing a front-facing camera when the mobile terminal needs to be unlocked;

a cropping module, configured to carry out a 1080p image cropping on the original image by means of the register configured for the front-facing camera to obtain an eye image located in a special area of the original image;

an analysis and processing module, configured to carry out an eyeprint analysis and processing on the eye image to acquire eyeprint information of the current user; and a comparison module, configured to make a comparison between the eyeprint information and prestored eyeprint information to determine whether a comparison result shows that they are identical or not, and unlock the mobile terminal if it is determined that they are identical.

The system for unlocking a mobile terminal on the basis of a high-quality eyeprint image may include the cropping module being specifically configured to crop the original image by means of a horizontal cropping start register, a horizontal cropping end register, a vertical cropping start register and a vertical cropping end register configured for the front-facing camera, and an offset may be adjusted by means of a configured horizontal offset register and a vertical offset register.

The system for unlocking a mobile terminal on the basis of a high-quality eyeprint image may include the cropped eye image being in the middle of the original image.

The system for unlocking a mobile terminal on the basis of a high-quality eyeprint image may include the analysis and processing module being configured to synthesize and denoise the eye image to acquire the eyeprint information of the current user.

The system for unlocking a mobile terminal on the basis of a high-quality eyeprint image may further include: an activation module configured to activate a password or nine-grid pattern preset for the mobile terminal to unlock the mobile terminal once unlocking the mobile terminal has failed.

By means of a special register configured for the front-facing camera of the mobile terminal, an eye image in the original image may be directly cropped. In this way, the data transmission quantity [may be greatly reduced, the bandwidth may be saved, the transmission speed may be accelerated, and the eyeprint recognition accuracy may be improved.

DETAILED DESCRIPTION OF THE EMBODIMENTS

The present invention may provide a method and a system for unlocking a mobile terminal on the basis of a high-quality eyeprint image. To make the objectives, technical solutions, and effects of the present invention clearer, the following may further describe in detail the present invention. It may be understood that the embodiments described herein are only intended to explain the present invention, and are not restrictive of the present invention.

Figure 1:
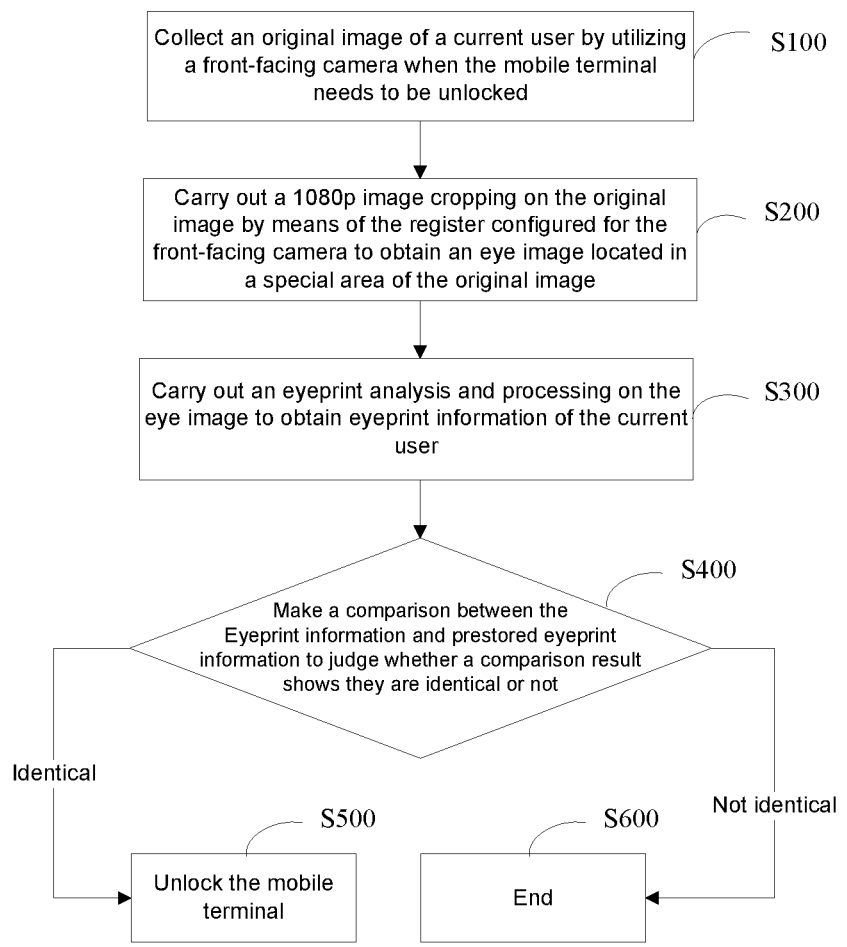
FIG. 1 is a flowchart of a method for unlocking a mobile terminal on the basis of a high-quality eyeprint image according to an embodiment of the present invention.

FIG. 1, which is a flowchart of a method for unlocking a mobile terminal on the basis of a high-quality eyeprint image according to an embodiment of the present invention may include:

S100: Collect an original image of a current user by utilizing a front-facing camera when the mobile terminal needs to be unlocked;

S200: Carry out a 1080p image cropping on the original image by means of the register configured for the front-facing camera to obtain an eye image located in a special area of the original image;

S300: Carry out an eyeprint analysis and processing on the eye image to obtain eyeprint information of the current user;

S400: Make a comparison between the eyeprint information and prestored eyeprint information to determine whether a comparison result shows that they are identical or not; and execute Step S500 if it is determined that they are identical, or execute Step S600 if it is judged that they are not identical;

S500: Unlock the mobile terminal; or

S600: End.

In the eyeprint recognition lock screen technologies, only eye texture information may be utilized for recognition, that is, regarding the original image of the user acquired by the front-facing camera of the mobile terminal, other parts may be redundant images except the eye image, and these redundant images may have a negative effect on the unlocking speed, thereby causing problems of oversize data transmission, a waste of bandwidth and a low transmission speed by the integral eye image. Generally 1080p down scale may be carried out on an image data source, by setting up a prompt for image correction in an original image. The user may place eyes in the middle position of the image and then this part may be analyzed and processed. 1080p down scale may be carried out by means of a full pixel, which may lose a part of eye details. Furthermore, only a part of the image may be analyzed and processed, but it may be outputted in full pixel, which may cause problems of bandwidth waste and a low transmission speed.

The present invention adopt a special register configured for the front-facing camera of the mobile terminal. 1080p image cropping may be carried out on the original image by means of the register configured for the front-facing camera, so that an eye image located in a special area of the original image may be directly obtained, thereby solving the problems, in the prior art, of loss of a part of eye details, oversize transmission data of the integral eye image, a waste of bandwidth and a low transmission speed.

In Step S100, before unlocking the mobile terminal, the following steps may be included: collecting an original image of a mobile terminal user (the owner of the mobile terminal) by utilizing a front-facing camera; carrying out a 1080p image cropping on the original image of the mobile terminal user (the owner of the mobile terminal) by means of a register configured for the front-facing camera to obtain an eye image located in a special area of the original image; and finally carrying out an eyeprint analysis and processing on the eye image to acquire eyeprint information of the mobile terminal user and storing the eyeprint information in the mobile terminal locally. Before unlocking the mobile terminal, the eyeprint information of the mobile terminal user (the owner of the mobile terminal) may be acquired in advance, and the eyeprint information may be stored in the mobile terminal locally. The process of acquiring the eyeprint information of the mobile terminal user may be the same as that of acquiring the eyeprint information of the current user. The following may introduce in detail the process of acquiring the eyeprint information of the current user, and thus the process of acquiring the eyeprint information of the mobile terminal user may not be described herein. After the eyeprint information of the mobile terminal user is prestored, when the mobile terminal needs to be unlocked, the eyeprint information of the current user may be acquired, then the eyeprint information may be compared with the prestored eyeprint information of the mobile terminal user, and then it may be determined whether or not the comparison result shows that they are identical. In this way, it may be determined whether or not the current user is the owner of the mobile terminal. In this way, in a collection process in the present invention, the same front-facing camera may be used for collection, which may ensure the uniformity of the image in the unlocking process and the collection process and avoid an error originated from different front-facing cameras. The same mobile terminal may be adopted in the cropping processing procedure. In addition, data may be stored in the mobile terminal locally to prevent the data from repeatedly uploading or downloading, thereby reducing the flow and improving the processing speed.

A 1080p image cropping may be carried out on the original image by means of a register configured for the front-facing camera so that an eye image located in a special area of the original image is obtained. Specifically, in a power-on process of the mobile terminal, the front-facing camera of the present invention may be enumerated as two devices: one device may serve as a common applications device, and the other device may serve an eyeprint recognition device. The operation procedure for acquiring an eye image in the present invention may be as below:

open( ): power on the front-facing camera, conduct an initialization operation on the system, use the front-facing camera of the mobile terminal to collect the original image of the current user, and then use Function open( ) to start up the 1080p image cropping function;

setPreviewDisplay(SurfaceHolder): after using the Function open( ), use Function setPreviewDisplay(SurfaceHolder) to set preview display;

startPreview( ): then use Function startPreview( ) to start preview, from this stage, the user may see an image; by using the 1080p image cropping function of the present invention, each frame of image may be acquired from preview output of frames, and a 1080p image cropping is started to be carried out on the original image;

stopPreview( ): use Function stopPreview( ) to stop preview; and release( ): use Function release( ) to release the eye image.

Step S200 may include the following steps:

S201: Crop the original image by means of a horizontal cropping start register, a horizontal cropping end register, a vertical cropping start register and a vertical cropping end register configured for the front-facing camera, and adjust an offset by means of a configured horizontal offset register and a vertical offset register.

The present invention may adopt a special register configured for the front-facing camera of the mobile terminal, and a 1080p image cropping may be carried out on the original image by means of the register configured for the front-facing camera, so that an eye image located in a special area of the original image may be directly obtained. The special register may include a horizontal cropping start register H_crop_start, a horizontal cropping end register H_crop_end, a vertical cropping start register V_crop_start and a vertical cropping end register V_crop_end. The original image may be cropped by means of the foregoing registers and an offset may be adjusted by means of a configured horizontal offset register H_offset and a vertical offset register V_offset. In this way, the eye image in the original image may be directly obtained. Further, in the present invention, the cropped image may be in the middle of the original image. In the present invention, the foregoing register may be configured for the front-facing camera of the mobile terminal, so that a well-cropped eye image may be directly obtained by means of the front-facing camera of the mobile terminal, thereby preventing loss of a part of eye details, oversize transmission data of the integral eye image, a waste of bandwidth and a low transmission speed.

By using the foregoing 1080p image cropping technology of the present invention, the problem of lens shading may also be solved. This is because the intensity of light received by a fringe area of a mirror image region of a sensor is smaller than that of light received by a center, due to optical characteristics of the lens. Therefore, lens shading may be needed to make the whole image uniform in brightness. However, the problem of lens shading may be greatly alleviated by using a 1080p image cropping in the middle. Although this may reduce the view angle, zero impact is caused to eyeprint recognition. Also a larger eye image may be acquired for eyeprint recognition, and the eye image may be an image merely needing a part of the eyes. In addition, a 1080p image cropping may be directly used without the need for image scaling, so that no eye detail is lost and the view angle is reduced, and the eye image may account for a large portion of the whole image. Furthermore, data transmission quantity may be reduced, and the sensor may be enabled to directly crop a 1080p image as an image source for eyeprint recognition. In this way, the data transmission can be reduced, the bandwidth can be saved, and the transmission speed can be accelerated.

Step S300 may include: synthesizing and denoising the eye image to acquire the eyeprint information of the current user. After acquiring the eyeprint image in the foregoing Step S200, in the Step S300, data analysis and processing such as synthesizing and denoising and so on can be carried out on the eye image to obtain the eyeprint information of the current user. The eye image may be denoised by utilizing a multi-scale denoising algorithm and a median filter algorithm to obtain the eyeprint information of the current user.

The present invention may further include: activating a password or nine-grid pattern preset for the mobile terminal to unlock the mobile terminal once unlocking the mobile terminal has failed. Also a password or nine-grid pattern unlock manner may be preset for the mobile terminal. This is because eyeprint image recognition may have a certain probability of failure in unlocking the mobile terminal. An alternative password or nine-grid pattern unlock manner can be preset so that the alternative unlock manner is started to unlock the mobile terminal once the eyeprint recognition has failed.

Figure 2:
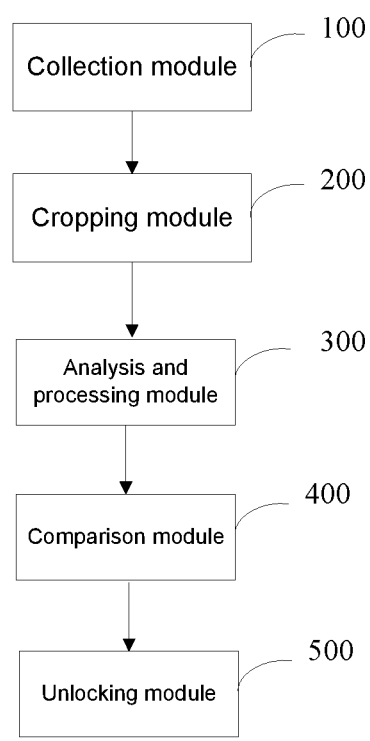
FIG. 2 is a structural block diagram of a system for unlocking a mobile terminal on the basis of a high-quality eyeprint image according to an embodiment of the present invention.

Based on the foregoing method, the present invention may further provide a structural block diagram of a system for unlocking a mobile terminal on the basis of a high-quality eyeprint image according to an embodiment of the present invention, as shown in FIG. 2. The system may include:

a collection module 100, configured to collect an original image of a current user by utilizing a front-facing camera when the mobile terminal needs to be unlocked;

a cropping module 200, configured to carry out a 1080p image cropping on the original image by means of the register configured for the front-facing camera to obtain an eye image located in a special area of the original image;

an analysis and processing module 300, configured to carry on an eyeprint analysis and processing on the eye image to acquire eyeprint information of the current user;

a comparison module 400, configured to make a comparison between the eyeprint information and prestored eyeprint information to determine whether a comparison result shows that they are identical or not; and execute an unlocking module 500 if it is determined that they are identical; or end if it is determined that they are not identical; and the unlocking module 500, configured to unlock the mobile terminal.

The cropping module 200 can be configured to crop the original image by means of a horizontal cropping start register, a horizontal cropping end register, a vertical cropping start register and a vertical cropping end register configured for the front-facing camera, and configured to adjust an offset by means of a configured horizontal offset register and a vertical offset register.

The eye image cropped by the cropping module 200 in the present invention may be positioned in the middle of the original image.

The analysis and processing module 300 can be specifically configured to synthesize and denoise the eye image to acquire eyeprint information of the current user.

The present invention may further include: an activation module, configured to activate a password or nine-grid pattern preset for the mobile terminal to unlock the mobile terminal once unlocking the mobile terminal has failed.

By means of a special register configured for the front-facing camera of the mobile terminal, a 1080p image source can be used as a data source for discrimination, so that a 1080p eye image in the original image can be directly cropped. In this way, the oversize transmission data can be greatly reduced, the bandwidth can be saved, the transmission speed can be accelerated, and the eyeprint recognition accuracy can be improved.

It is to be understood that application of the present invention is not limited to the foregoing examples, those of ordinary skill in the art may make improvements or transformations according to the foregoing description, and all these improvements and transformations should fall within the scope of protection of the appended claims of the present invention.

The invention claimed is:

1. A method for unlocking a mobile hardware terminal on the basis of a high-quality eyeprint image, including:
   collecting an original image of a user in advance by utilizing a front-facing camera;
   wherein the front-facing camera includes two devices, with one of the two devices serving as a common applications device and the other of the two devices serving as an eyeprint recognition device;
   obtaining an eye image located in a special area of the original image collected in advance by:
      carrying out a 1080p image cropping on the original image collected in advance while simultaneously accelerating a transmission speed of data in the cropping on the original image and reducing a quantity of the data transmitted for the original image using a horizontal cropping start register, a horizontal cropping end register, a vertical cropping start register, and a vertical cropping end register configured for the front-facing camera, and
      adjusting an offset of the eye image using a configured horizontal offset register and a vertical offset register;
   carrying out an eyeprint analysis and processing on the eye image to acquire eyeprint information of the user;
   storing the acquired eyeprint information in the mobile hardware terminal locally as prestored eyeprint information; and
   collecting the original image of a current user by utilizing the front-facing camera when the mobile hardware terminal needs to be unlocked, wherein the 1080p image cropping includes the current user previewing the original image and the mobile hardware terminal processing the 1080p image cropping on previewed frames of the original image;
   carrying out the 1080p image cropping on the original image of the current user by the horizontal cropping start register, the horizontal cropping end register, the vertical cropping start register, and the vertical cropping end register configured for the front-facing camera to obtain an eye image located in a special area of the original image of the current user;
   synthesizing and denoising the eye image by utilizing a multi-scale denoising algorithm and a median filter algorithm to acquire the acquired eyeprint information of the current user;
   making a comparison between the acquired eyeprint information of the current user and the prestored eyeprint information to determine whether a comparison result shows that they are identical or not;
   unlocking the mobile hardware terminal if it is determined that they are identical; and
   activating a first password or nine-grid pattern preset for the mobile hardware terminal to unlock the mobile hardware terminal once unlocking the mobile hardware terminal has failed if it is determined that they are not identical.

2. The method for unlocking a mobile hardware terminal on the basis of a high-quality eyeprint image according to claim 1, wherein cropping the original image of the user shows that the cropped eye image is in the middle of the original image of the current user.

3. The method of claim 1, wherein an alternate password is activated in response to a failure of the system to unlock the mobile hardware terminal with the first password.

4. The method of claim 1, wherein the front-facing camera includes a preview function.

5. The method of claim 1, wherein the front-facing camera includes an applications device separate from an eyeprint recognition device.

6. A system for unlocking a mobile hardware terminal on the basis of a high-quality eyeprint image, comprising:
   a mobile hardware terminal, configured to collect an original image of a current user by utilizing a front-facing camera when the mobile hardware terminal needs to be unlocked;
   wherein the front-facing camera includes two devices, with one of the two devices serving as a common applications device and the other of the two devices serving as an eyeprint recognition device;
   the mobile hardware terminal configured to obtain an eye image located in a special area of the original image collected in advance by:
      carrying out a 1080p image cropping on the original image while simultaneously accelerating a transmission speed of data in the cropping on the original image and reducing a quantity of the data transmitted for the original image using a horizontal cropping start register, a horizontal cropping end register, a vertical cropping start register, and a vertical cropping end register configured for the front-facing camera, and
      adjusting an offset of the eye image using a configured horizontal offset register and a vertical offset register;
   the mobile hardware terminal configured to carry out an eyeprint analysis and processing on the eye image to acquire eyeprint information of the current user; and
   the mobile hardware terminal configured to store the acquired eyeprint information in the mobile hardware terminal locally as prestored eyeprint information;
   the mobile hardware terminal configured to collect the original image of a current user by utilizing the front-facing camera when the mobile hardware terminal needs to be unlocked, wherein the 1080p image cropping includes the current user previewing the original image and the mobile hardware terminal processing the 1080p image cropping on previewed frames of the original image;
   the mobile hardware terminal configured to carry out the 1080p image cropping on the original image of the current user by the horizontal cropping start register, the horizontal cropping end register, the vertical cropping start register, and the vertical cropping end register configured for the front-facing camera to obtain an eye image located in a special area of the original image of the current user;
   the mobile hardware terminal configured to synthesize and denoise the eye image by utilizing a multi-scale denoising algorithm and a median filter algorithm to acquire the acquired eyeprint information of the current user;
   the mobile hardware terminal configured to make a comparison between the acquired eyeprint information of the current user and the prestored eyeprint information to determine whether a comparison result shows that they are identical or not;

the mobile hardware terminal configured to unlock the mobile hardware terminal if it is determined that they are identical; and the mobile hardware terminal configured to activate a first password or nine-grid pattern preset for the mobile hardware terminal to unlock the mobile hardware terminal once unlocking the mobile hardware terminal has failed if it is determined that they are not identical.

7. The system for unlocking a mobile hardware terminal on the basis of a high-quality eyeprint image according to claim 6, wherein the cropped eye image is in the middle of the original image.

8. The system of claim 6, wherein the front-facing camera includes an applications device separate from an eyeprint recognition device.

9. The system of claim 6, wherein the front-facing camera includes a preview function.

* * * * *